(12) United States Patent
Wili

(10) Patent No.: US 6,575,500 B1
(45) Date of Patent: Jun. 10, 2003

(54) DEVICE FOR CONNECTING A PIPE SOCKET, A TUBULAR MOUNTING PART OR A FITTING TO A PIPE

(75) Inventor: Hansruedi Wili, Jona (CH)

(73) Assignee: Geberit Technik AG, Jona (CH)

( * ) Notice: Subject to any disclaimer, the term of this patent is extended or adjusted under 35 U.S.C. 154(b) by 0 days.

(21) Appl. No.: 09/647,593

(22) PCT Filed: Jan. 25, 1999

(86) PCT No.: PCT/CH99/00032
§ 371 (c)(1),
(2), (4) Date: Nov. 22, 2000

(87) PCT Pub. No.: WO99/51907
PCT Pub. Date: Oct. 14, 1999

(30) Foreign Application Priority Data

Apr. 3, 1998 (CH) ............................................. 0800/98

(51) Int. Cl.[7] ................................................ F16L 33/00
(52) U.S. Cl. ........................ 285/243; 285/322; 285/239; 285/382
(58) Field of Search .................. 285/322, 239, 285/259, 370, 377, 382, 253, 243

(56) References Cited

U.S. PATENT DOCUMENTS

| 350,188 | A | * | 10/1886 | Cox et al. ................. 285/243 |
| 2,310,536 | A | | 2/1943 | Melsom |
| 4,738,475 | A | * | 4/1988 | Ebert ....................... 285/243 X |
| 5,064,227 | A | * | 11/1991 | Spors et al. ............. 285/239 X |
| 5,378,023 | A | * | 1/1995 | Olbrich ................... 285/259 X |
| 5,626,371 | A | * | 5/1997 | Bartholomew .............. 285/319 |
| 6,086,119 | A | | 7/2000 | Hansel |
| 6,131,964 | A | * | 10/2000 | Sareshwala ................ 285/382 |
| 6,145,892 | A | * | 11/2000 | Weber ........................ 285/259 |
| 6,170,887 | B1 | * | 1/2001 | Salomon-Bahls et al. ... 285/322 |

FOREIGN PATENT DOCUMENTS

| DE | 197 07 827 | 8/1998 |
| EP | 0 132 673 | 2/1985 |
| EP | 0 534 658 | 3/1993 |
| FR | 2 718 822 | 10/1995 |
| GB | 438 250 | 11/1935 |
| SU | 199595 | 10/1967 |
| SU | 1610186 | 11/1990 |

* cited by examiner

Primary Examiner—Lynne E. Browne
Assistant Examiner—David E. Bochna
(74) Attorney, Agent, or Firm—Browdy and Neimark, P.L.L.C.

(57) ABSTRACT

A device for connecting a pipe socket, a tubular mounting part or a fitting (3) to a pipe (10), especially a water pipe. The inventive device comprises a connecting part (7). A first end (7a) of the connecting part is to be connected to a pipe (10) by a press connection, and a second end (7b) of the connecting part is to be connected to the pipe socket, mounting part or fitting (3). The second end (7b) of the connecting part (7) forms a plug-connection with a receiving part (4) of the pipe socket, the tubular mounting part or the fitting (3). After the press-connection is provided, the connecting part (7) is merely plugged in to connect a pipe (10), for example, to a mounting part.

Figure 1:
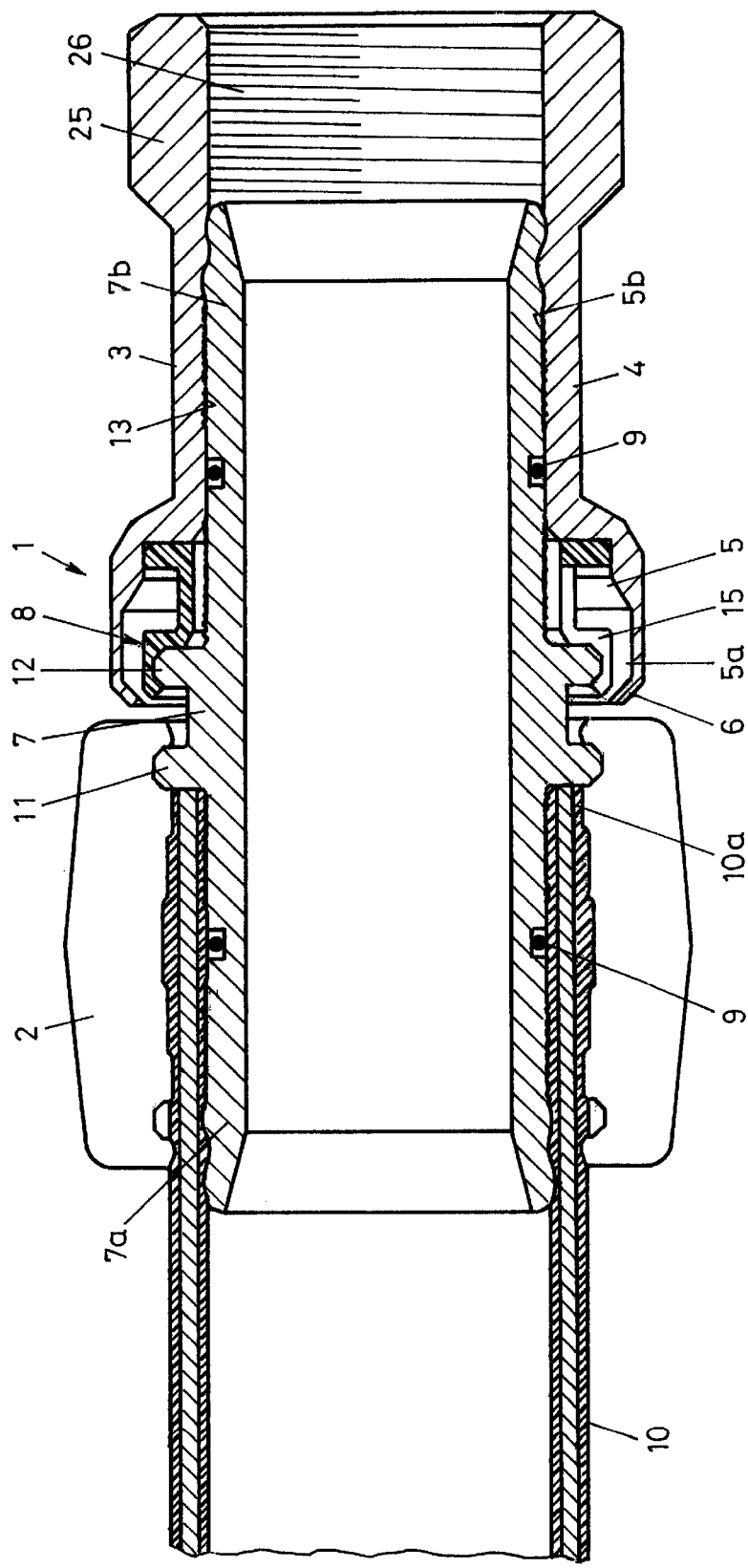

16 Claims, 2 Drawing Sheets

DEVICE FOR CONNECTING A PIPE SOCKET, A TUBULAR MOUNTING PART OR A FITTING TO A PIPE

ACROSS REFERENCE TO RELATED APPLICATION

The present application is the national stage under 35 U.S.C. 371 of PCT/CH99/00032, filed Jan. 25, 1999.

The invention relates to a connector between a pipe socket, a tubular mounting part or a fitting and a pipe, in particular a water pipe, having a connecting part which is connected by a first end to the pipe by means of a press connection and by a second end to the pipe socket, mounting part or fitting.

DE-U-91 13 050 by the Applicant describes a device having a connecting part which has, at one or at both ends, a socket to which the end of a composite pipe can be joined in a water-tight manner by pressing using pressing tongs. In the design according to FIGS. 1 to 3, the connecting part has a first end for producing a press connection and a second end having an external thread for producing a screw connection to a sanitary mounting. In the case of the design according to FIG. 4, both ends each have a socket for producing a press connection.

The invention is based on the object of providing a connector of the above-mentioned type which is to be even more simple to handle for installation purposes.

In the case of a connector of the generic type, the object is achieved by the second end of the connecting part forming a plug-in connection with a receiving part of the pipe socket, tubular mounting part or fitting. In order to join a pipe to a mounting, a fitting or a pipe socket, the connecting part then merely has to be plugged into the receiving part before or after the press connection to the pipe is produced. Time-consuming screwing processes are avoided and the connection is simplified at installation locations which are tight and difficult to get at. According to a development of the invention, the second end is of essentially the same design as the first end. The connecting part then therefore has two ends which can be connected in each case to a pipe by means of a press connection. The connecting part can therefore be designed in such a manner that it can be used either for connecting pipes or for connecting one pipe to a mounting, a pipe socket or a fitting. The holding in storage and also the installation are therefore substantially simplified.

If, according to a development of the invention, a housing of the receiving part is provided with an opening into which a radially expandable retaining ring is inserted, a particularly advantageous design of the plug-in connection in terms of structure is produced. This retaining ring can be produced as a separate, loose part as a plastic part. When the second end is inserted into the receiving part, the retaining ring is expanded radially and connects the connecting part to the pipe socket, tubular mounting part or to the fitting.

The invention also relates to a mounting or to a fitting for a connector as claimed in claim 1 and also to a connecting part for such a mounting or fitting.

Further advantageous features result from the dependent patent claims, the description below and also the drawing.

Figure 2:
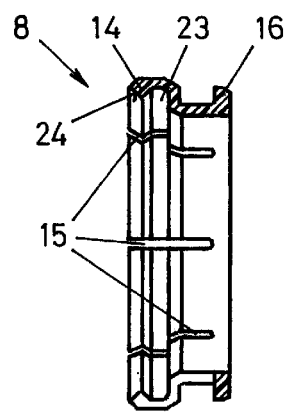
Figure 3:
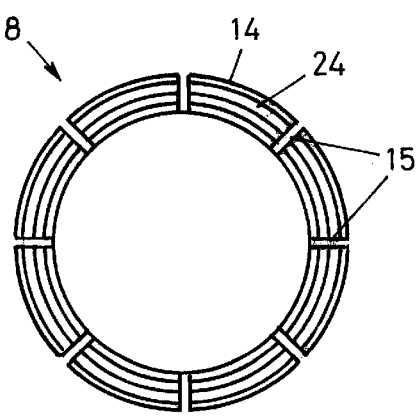
Figure 4:
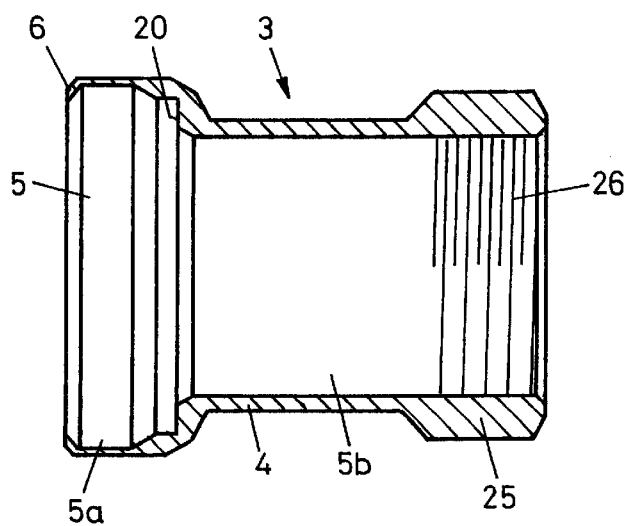
Figure 5:
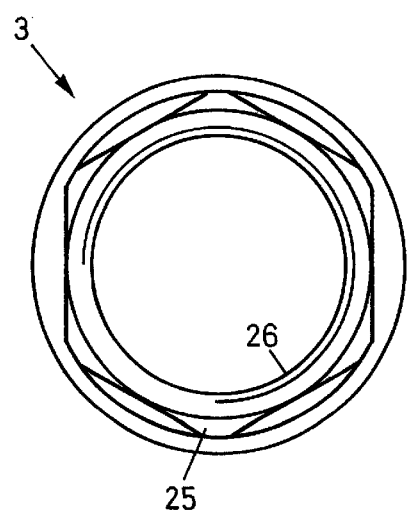

An exemplary embodiment of the invention is explained in greater detail below with reference to the drawing, in which:

FIG. 1 shows a longitudinal section through a device according to the invention, FIG. 2 shows a section through a retaining ring, FIG. 3 shows a view of the retaining ring according to FIG. 2, FIG. 4 shows a section through a fitting, and FIG. 5 shows a view of the fitting according to FIG. 4.

The device 1 shown in FIG. 1 essentially comprises a connecting part 7 and a fitting 4 into which a retaining ring 8 is inserted. The connecting part 7 has a first end 7a and a second end 7b. Both ends are designed as cylindrical sockets and have an uneven outside 13 into which a rubbery elastic sealing ring 9 is inserted in each case. The connecting part 7 has, approximately centrally, two integrally formed, encircling flanges 11 and 12 which are arranged at a distance from each other and extend radially outward.

The first end 7a forms a press connection with a pipe 10. The pipe 10 is preferably a water pipe and, for example, a composite pipe. Pipes of this type are generally known and can be deformed plastically in order to produce a press connection. Pressing tongs 2, by means of which the press connection has been produced, are indicated schematically in FIG. 1. These pressing tongs 2 are, of course, removed again once the press connection is produced. The flange 11 serves here as a stop for the pipe 10 and for positioning the pressing tongs 2. The sealing ring 9 is pressed between the pipe end 7a and the pipe end 10a and ensures the tightness of the press connection.

The second end 7b is of the same design as the first end 7a. However, the external diameter of this second end 7b can differ from the external diameter of the first end 7a. It is, however, in any case designed in such a manner that it can likewise be used for producing a press connection. The second end 7b is therefore likewise a tubular socket, but here forms a connector part which is inserted into an opening 5 of a receiving part 4 of the fitting 3. The second end 7b forms a plug-in connection with the receiving part 4. As can clearly be seen in particular in FIG. 4, the opening 5 consists of a region 5a which is widened annularly and of a somewhat narrower, cylindrical, tubular region 5b. According to FIG. 1, the retaining ring 8, which is preferably produced from plastic by injection molding, is inserted into the region 5a. This ring 8 has, at a front end, a plurality of identical claws 14 which are formed by axial slots 15 and are connected to one another at a rear edge 16. According to FIG. 1, the edge 16 bears against a shoulder 20 (FIG. 4) of the receiving part 4. The claws 14 can be expanded radially and elastically outward. As a whole they form an encircling groove 23 on the inside which serves for receiving the flange 12. The retaining ring 8 is inserted loosely and with little play into the opening 5.

If the second end 7b is inserted into the opening 5 in order to produce the plug-in connection, when the flange 12 is placed on to inclined run-on surfaces 24 the claws 14 are expanded elastic ally and radially outward, with the result that the flange 12 can snap into the groove 23. The claws 14 then essentially return back into the rest position and grip around the flange 12.

T the receiving part 4 has, at the front end, a radially and obliquely inwardly directed edge 6 which forms an axial stop for the retaining ring 8. If the flange 12 is now snapped into the retaining ring 8, the retaining ring 8 can no longer be pulled out of the opening 5, since, as mentioned, the edge 6 forms a stop for the retaining 8. The flange 12 retains the claws 14 in the position shown, with the result that these claws 14 are unable to yield radially inward if it is attempted to release the plug-in connection by pulling out the connecting part 7. An essentially non-releasable plug-in connection is therefore formed when the connecting part 7 is plugged completely into the opening 5 of the fitting 3. The connection could, if necessary, be released by destruction of the retaining ring 8.

The tightness of the plug-in connection is ensured by the sealing ring 9 which, in the region 5b of the opening, bears against the inside of the tubular section of the fitting 3. This tubular region 5b receives a substantial part of the second end 7b and at th is end 7b lies against the connecting part 7a and forms a support. The connecting part 7 is therefore held in an axially secure manner in the opening 5 of the fitting 3, is sealed and is secured against axial tilting.

The connecting part 7 can also be used for connecting two pipe ends. In this case, the second end 7b, like the first end 7a, is used to produce a press connection. Like the flange 11, in this case the flange 12 forms a stop for a pipe 10 and for guiding the pressing tongs 2.

The fitting 3 is produced, for example, from brass. It has an internal thread 26 at one connecting end 15 for a further connection. The fitting 3 can therefore be connected to a further part at the end 25 by means of a screw connection. However, the fitting 3 can also be a mounting, a tubular mounting part or a pipe socket. An essential feature is the tubular receiving part 4 which enables the production of a plug-in connection to the part 7.

During installation, the press connection between the part 7 and the composite pipe 10 is generally produced by means of the pressing tongs 2. The free end 7b is subsequently inserted into the receiving part 4 as explained above. The snap-in connection with the retaining ring 8 takes place automatically here and tools are not required for this. A plug-in connection of this type can also be produced very simply at a location which is difficult to get at and, as mentioned, without tools. The snapping-in of the retaining ring 8 can clearly be recognized and can also be checked. It is therefore ensured that the plug-in connection is always completed. This is an essential aspect in the sphere of sanitary technology.

What is claimed is:

1. A connector comprising a fitting (3) and a connecting part (7) for connecting said fitting (3) to a pipe (10), wherein:
   said connecting part (7) has a first end (7a) that is connectable to the pipe, a second end (7b) that is connected to said fitting and a radially outwardly projecting flange (12);
   said fitting has a receiving part (4) via which said fitting is connected to said connecting part;
   said receiving part is provided with an opening (5);
   said connector further comprises a radially expandable retaining ring (8) inserted into said opening, said retaining ring having an interior surface provided with a circumferentially extending groove (23) into which said flange is snapped to form an essentially non-releasable plug-in connection between said second end of said connecting part and said receiving part of said fitting; and
   the second end (7b) of the connecting part (7) is of essentially the same design as the first end (7a).

2. The connector as claimed in claim 1, characterized in that said receiving part (4) of the fitting (3) has an opening (5) into which a radially expandable retaining ring (8) is inserted.

3. The connector as claimed in claim 2, characterized in that the retaining ring (8) is inserted loosely into said opening (5).

4. The connector as claimed in claim 2, characterized in that the retaining ring (8) has gripping means (14) which grip around said first flange (12).

5. The connector as claimed in claim 4, characterized in that the gripping means (14) have a plurality of radially and elastically deflectable claws.

6. The connector as claimed in claim 2, characterized in that the retaining ring (8) is produced from an elastic plastic.

7. The connector as claimed in claim 2, characterized in that the receiving part (4) has an edge (6) which engages in said opening (5) and forms an axial stop for the retaining ring (8).

8. The connector as claimed in claim 1, characterized in that the connecting part (7) is a press fitting.

9. The connector as claimed in claim 1, characterized in that the receiving part (4) has a tubular region (5) in which the second end (7b) is supported.

10. The connector as claimed in claim 1, characterized in that the connecting part (7) has a second radially outwardly projecting flange (11) arranged at a distance from said first flange (12), said second flange being used to produce a press connection.

11. The connector as claimed in claim 1, characterized in that the connecting part (7) has an outer side and two sealing rings (9) which are arranged on the outer side at a distance from each other.

12. The connector as claimed in claim 1, characterized in that the plug-in connection is a snap-in connection.

13. The connector as claimed in claim 1, characterized in that the opening (5) has a rear and a front stop (20, 6) for the axial fixing of the retaining ring (8).

14. The connector as claimed in claim 13, characterized in that the rear stop (20) is a shoulder and the front stop (6) is a radially inwardly projecting mouth edge.

15. The connector as claimed in claim 1, characterized in that said fitting has a housing made of metal and the retaining ring (8) is produced from plastic.

16. A connector comprising a fitting (3) and a connecting part (7) for connecting said fitting (3) to a pipe (10), wherein:
   said connecting part (7) has a first end (7a) that is connectable to the pipe, a second end (7b) that is connected to said-fitting and a radially outwardly projecting flange (12);
   said fitting has a receiving part (4) via which said fitting is connected to said connecting part;
   said receiving part is provided with an opening (5);
   said connector further comprises a radially expandable retaining ring (8) inserted into said opening, said retaining ring having an interior surface provided with a circumferentially extending groove (23) into which said flange is snapped to form an essentially non-releasable plug-in connection between said second end of said connecting part and said receiving part of said fitting;
   said retaining ring (8) has gripping means (14) which grip around said first flange (12); and
   said gripping means (14) have a plurality of radially and elastically deflectable claws.

* * * * *